United States Patent
Ohashi et al.

(10) Patent No.: US 9,302,576 B2
(45) Date of Patent: Apr. 5, 2016

(54) POWER TRANSMITTING APPARATUS FOR A HYBRID VEHICLE

(75) Inventors: Tatsuyuki Ohashi, Hamamatsu (JP); Shouji Asatsuke, Hamamatsu (JP); Akio Oishi, Hamamatsu (JP); Ryouhei Chiba, Hamamatsu (JP); Jun Ishimura, Hamamatsu (JP); Keiichi Ishikawa, Hamamatsu (JP)

(73) Assignee: Kabushiki Kaisha F.C.C., Hamamatsu-shi (JP)

( * ) Notice: Subject to any disclaimer, the term of this patent is extended or adjusted under 35 U.S.C. 154(b) by 222 days.

(21) Appl. No.: 13/104,868

(22) Filed: May 10, 2011

(65) Prior Publication Data
US 2011/0301796 A1 Dec. 8, 2011

Related U.S. Application Data

(63) Continuation-in-part of application No. PCT/JP2009/005972, filed on Nov. 10, 2009.

(30) Foreign Application Priority Data

Nov. 11, 2008 (JP) ................................. 2008-288696

(51) Int. Cl.
*B60K 6/48* (2007.10)
*B60K 6/387* (2007.10)
(Continued)

(52) U.S. Cl.
CPC . *B60K 6/48* (2013.01); *B60K 6/387* (2013.01); *B60K 6/40* (2013.01); *B60K 6/543* (2013.01);
(Continued)

(58) Field of Classification Search
USPC .......................................................... 701/22
See application file for complete search history.

(56) References Cited

U.S. PATENT DOCUMENTS 6,638,193 B2    10/2003  Hamai
7,272,986 B2 *   9/2007  Janson ............................ 74/340
(Continued)

FOREIGN PATENT DOCUMENTS

CN    1874912 A    12/2006
CN  101000084 A     7/2007
(Continued)

OTHER PUBLICATIONS

Office Action received in Japanese Patent Application No. 2008-288696, dated Nov. 5, 2012; in 3 pages.
(Continued)

*Primary Examiner* — Shelley Chen
(74) *Attorney, Agent, or Firm* — Knobbe, Martens, Olson & Bear, LLP

(57) ABSTRACT

A power transmitting apparatus for a hybrid vehicle can transmit the driving force of engine E to the motor M or reversely the driving force of motor M to the engine E when the vehicle is stopped while avoiding transmission of the driving force of either of them to the driving wheels D such that the vehicle remains stopped. In some embodiments, a power transmitting apparatus for a hybrid vehicle can comprise a first clutch operatively posited between an engine mounted on a vehicle to driving wheels in a power transmission system and configured to transmit or cutoff driving force of the engine to or from the driving wheels; a second clutch operatively positioned between a motor mounted on a vehicle to the driving wheels in a power transmission system and configured to transmit or cut off driving force of the motor to or from the driving wheels. The first and second clutches can operated based on the vehicle operating conditions such that power can be transmitted from one of the engine and the motor to the other of them by connecting them to each other while cutting off power transmission from the engine and the motor to the driving wheels.

19 Claims, 16 Drawing Sheets

(51) Int. Cl.
*B60K 6/40* (2007.10)
*B60K 6/543* (2007.10)
*B60K 6/547* (2007.10)
*B60L 11/14* (2006.01)
*B60W 10/02* (2006.01)
*B60W 10/08* (2006.01)
*B60W 10/113* (2012.01)
*B60W 20/00* (2006.01)
*F16H 3/00* (2006.01)
*F16H 9/18* (2006.01)

(52) U.S. Cl.
CPC ................. *B60K 6/547* (2013.01); *B60L 11/14* (2013.01); *B60W 10/02* (2013.01); *B60W 10/08* (2013.01); *B60W 10/113* (2013.01); *B60L 2210/20* (2013.01); *B60L 2260/22* (2013.01); *B60W 20/00* (2013.01); *B60W 2510/244* (2013.01); *B60Y 2400/428* (2013.01); *F16H 3/006* (2013.01); *F16H 9/18* (2013.01); *F16H 2200/0043* (2013.01); *Y02T 10/6221* (2013.01); *Y02T 10/70* (2013.01); *Y02T 10/7077* (2013.01); *Y02T 10/725* (2013.01); *Y10T 477/26* (2015.01)

(56) References Cited

U.S. PATENT DOCUMENTS

| | | | | |
|---|---|---|---|---|
| 2002/0086755 | A1 | 7/2002 | Hamai | |
| 2002/0148311 | A1* | 10/2002 | Kobayashi | 74/339 |
| 2006/0011004 | A1* | 1/2006 | Sakai et al. | 74/340 |
| 2007/0012128 | A1* | 1/2007 | Janson | 74/325 |
| 2007/0199396 | A1* | 8/2007 | Taniai | 74/335 |
| 2008/0189018 | A1* | 8/2008 | Lang et al. | 701/54 |
| 2009/0088292 | A1* | 4/2009 | Sasakura et al. | 477/78 |
| 2009/0298648 | A1* | 12/2009 | Sigmund | 477/169 |

FOREIGN PATENT DOCUMENTS

| | | | |
|---|---|---|---|
| CN | 2936821 Y | 8/2007 | |
| CN | 101088820 A | 12/2007 | |
| CN | 201003577 Y | 1/2008 | |
| FR | 2833538 | 6/2003 | |
| JP | H 02146345 A | 11/1988 | |
| JP | 2004-245325 | 9/2004 | |
| JP | 2004245325 A * | 9/2004 | ............ F16H 61/04 |
| JP | 2004-306826 | 11/2004 | |
| JP | 3121527 U | 4/2006 | |
| JP | 2006-199081 | 8/2006 | |
| JP | 2008-143242 | 6/2008 | |
| JP | 2008540977 A | 11/2008 | |
| WO | WO 2006125046 A1 | 11/2006 | |
| WO | WO 2007/022836 | 3/2007 | |
| WO | WO 2007/022836 A1 | 3/2007 | |

OTHER PUBLICATIONS

Chinese Search Report received in corresponding Chinese App No. 2009-801541577 (Publication No. 102271948), received Jul. 24, 2013; in 3 pages.

English Translation of International Search Report for App No. PCT/JP2009/005972, dated Dec. 22, 2009; in 1 pg.

English Translation of International Preliminary Report on Patentability & Written Opinion for App No. PCT/JP2009/005972, dated Jun. 21, 2011; in 6 pgs.

European International Search Report for PCT/JP2009/005972; dated Dec. 5, 2013, in 4 pages.

Office Action for Application No. 200980154157.7, dated Jul. 24, 2013; in 6 pages.

Office Action for Application No. 200980154157.7, dated Jan. 13, 2014; in 1 page.

Decision on Refusal for Application No. 200980154157.7, dated Jun. 23, 2014; in 1 page.

* cited by examiner

FIG. 9

| Range | | Mode | Operating state | | Clutch operation | | |
|---|---|---|---|---|---|---|---|
| | | | Engine | Motor | Engine clutch | Motor clutch | Direct-link clutch |
| N (Neutral) | — | Stoppage | × | × | × | × | × |
| | (1) | Engine start | ×→○ | ○ | × | × | ○ |
| | (2) | Battery charge | ○ | ○ (Generation of electricity) | × | × | ○ |
| D (Forward) | (3) | Motor drive Vehicle start·run | × | ○ | × | ○ | × |
| | (4) | Engine start | ×→○ | ○ | ○ | ○ | × |
| | (5) | Hybrid drive (Acceleration) | ○ | ○ | ○ | ○ | × |
| | (6) | Hybrid drive (Charge) | ○ | ○ (Generation of electricity) | ○ | ○ | × |
| | (7) | Engine drive Vehicle start·run | ○ | × | ○ | × | × |
| | (8) | Regenerative braking | × | ○ (Generation of electricity) | × | ○ | × |
| R (Reverse) | (9) | Motor drive Vehicle start·run | × | ○ (Reverse) | × | ○ | × |

FIG. 12

| Range | | Mode | Operating state | | Clutch operation | | |
|---|---|---|---|---|---|---|---|
| | | | Engine | Motor | Engine clutch | Motor clutch | Intermediate clutch |
| N (Neutral) | — | Stoppage | × | × | × | × | × |
| | (1) | Engine start | ×→○ | ○ | ○ | ○ | × |
| | (2) | Battery charge | ○ | ○ (Generation of electricity) | ○ | ○ | × |
| D (Forward) | (3) | Motor drive Vehicle start·run | × | ○ | × | ○ | ○ |
| | (4) | Engine start | ×→○ | ○ | ○ | ○ | ○ |
| | (5) | Hybrid drive (Acceleration) | ○ | ○ | ○ | ○ | ○ |
| | (6) | Hybrid drive (charge) | ○ | ○ (Generation of electricity) | ○ | ○ | ○ |
| | (7) | Engine drive vehicle start·run | ○ | × | × | × | ○ |
| | (8) | Regenerative braking | × | ○ (Generation of electricity) | ○ | ○ | ○ |
| R (Reverse) | (9) | Motor drive Vehicle start·run | × | ○ (Reverse) | × | ○ | ○ |

FIG. 15

| Range | | Mode | Operating state | | Clutch operation | | | |
|---|---|---|---|---|---|---|---|---|
| | | | Engine | Motor | Engine clutch | Motor clutch | Intermediate clutch for odd numbered gear | Intermediate clutch for even numbered gear |
| N (Neutral) | — | Stoppage | × | × | × | × | × | × |
| D (Forward) | (1) | Engine start | ×→○ | ○ | ○ | ○ | × | × |
| | (2) | Battery charge | ○ | ○ (Generation of electricity) | ○ | ○ | × | × |
| | (3) | Motor drive Vehicle start·run | × | ○ | × | ○ | ○ (Both) on gear shift | |
| | (4) | Engine start | ×→○ | ○ | ○ | ○ | | |
| | (5) | Hybrid drive (Acceleration) | ○ | ○ | ○ | ○ | | |
| | (6) | Hybrid drive (charge) | ○ | ○ (Generation of electricity) | ○ | ○ | | |
| | (7) | Engine drive Vehicle start·run | ○ | × | ○ | × | ○ (Either one) other than gear shift | |
| | (8) | Regenerative braking | × | ○ (Generation of electricity) | × | ○ | | |
| R (Reverse) | (9) | Motor drive Vehicle start·run | × | ○ (Reverse) | × | ○ | ○ (Either one) | |

POWER TRANSMITTING APPARATUS FOR A HYBRID VEHICLE

CROSS-REFERENCE TO RELATED APPLICATIONS

This application is a continuation-in-part of PCT Application No. PCT/JP2009/005972 filed on Nov. 10, 2009, which claims priority to Japanese Application No. 2008-288696, filed on Nov. 11, 2008, the entire contents of each of which are hereby incorporated by reference herein.

BACKGROUND

1. Technical Field

The present disclosure relates to power transmitting apparatuses, such as for a hybrid vehicle transmissions, which transmit or cut-off power from an engine or a motor depending on vehicle operating conditions.

2. Description of the Related Art

In recent years, hybrid vehicles have been equipped with both an engine and a motor in the interest of fuel consumption and environmental protection. Such hybrid vehicles can have improved fuel consumption and reduced exhaust emissions, compared to conventional vehicles that use only internal combustion engines, by properly driving either one of the engine or motor or both the engine and motor depending on vehicle operating conditions.

There has been developed, for example, a power transmitting apparatus for a hybrid vehicle comprising a first clutch operatively positioned in a power transmission system between an engine mounted on a vehicle and driving wheels and configured to transmit or cut-off the power transmission between the engine and the driving wheels, and a second clutch operatively positioned in a power transmission system between a motor mounted on a vehicle and the driving wheels and configured to transmit or cut-off the power transmission between the motor and the driving wheels, in which the first and second clutches are operated based on vehicle operating conditions (see e.g. Japanese Laid-open Patent Publication No. 306826/2004).

SUMMARY OF THE DISCLOSURE

An aspect of at least one of the inventions disclosed herein includes the realization that, in a hybrid vehicle, transmission of driving force from the engine to the driving wheels is undesirable when trying to start the engine, stopping the vehicle, or using the motor to generate electricity from the engine's driving force. For example, in a hybrid vehicle transmission with an engine clutch connecting the engine to the driving wheels and a motor clutch connecting the motor to the driving wheels, when the engine's driving force is being transmitted to the motor by actuating both the engine and motor clutches, the driving force is also undesirably transmitted to the driving wheels and impedes stopping of the vehicle.

In some embodiments, a power transmitting apparatus for a hybrid vehicle can transmit driving force between the engine and the motor while the vehicle is stopped without transmission of driving force to the driving wheels.

In some embodiments, a power transmitting apparatus for a hybrid vehicle can comprise a first clutch operatively positioned in a power transmission system between an engine mounted on a vehicle and driving wheels and configured to transmit or cut off a driving force of the engine to or from the driving wheels, and a second clutch operatively positioned in the power transmission system between a motor mounted on a vehicle and the driving wheels and configured to transmit or cut off a driving force of the motor to or from the driving wheels. The first and second clutches can be operated based on vehicle operating conditions. Power can be transmitted from one of the engine and the motor to the other of them by connecting them each other and cutting-off power transmission from the engine and the motor to the driving wheels.

In some embodiments, the power transmitting apparatus for a hybrid vehicle can comprise an additional clutch device operatively positioned between the engine and the motor such that the first and second clutches are bypassed and configured to transmit or cut off the driving force from one of the engine and the motor to the other of them. In some embodiments, the additional clutch can be arranged at a radially inner side of a rotor of the motor.

In some embodiments, the power transmitting apparatus for a hybrid vehicle can comprise an additional clutch operatively positioned between the output side of the first and second clutches and a transmission mounted on a vehicle and configured to transmit or cut off the driving force of the engine or the motor to or from the transmission.

In some embodiments, the power transmitting apparatus for a hybrid vehicle can comprise yet another clutch operatively positioned between the output side of the first and second clutches and the driving wheels such that the transmission mounted on a vehicle is bypassed, and is configured to transmit or cut off the driving force of the engine or the motor to or from the driving wheels without passing through the transmission.

In some embodiments, the first clutch, the second clutch and two hydraulic pistons, one of which corresponds to each of the first and second clutches, are arranged within a same housing, and the first and second clutches can be operated in a selective manner by controlling a hydraulic pressure for actuating the hydraulic pistons.

In some embodiments, the second clutch can be activated to transmit the driving force of the motor to the driving wheels and the first can be simultaneously deactivated to cut off the driving force of the engine to the driving wheels on start-up and operation of a vehicle driven by the motor.

In some embodiments, the motor can be reversed on reverse start-up and reverse-direction operation of a vehicle driven by the motor.

In some embodiments, the power transmitting apparatus for a hybrid vehicle can comprise a battery for driving the motor and a detector for determining a remaining electric charge of the battery. Both the driving forces of the engine and the motor can be simultaneously transmitted to the driving wheels by activating both the first and second clutches so long as the remaining electric charge of the battery determined by the detector is within a particular range.

In some embodiments, the power transmitting apparatus for a hybrid vehicle can comprise a battery for driving the motor and a detector for determining a remaining electric charge of the battery. The driving force of the engine can be transmitted both to the driving wheels and the motor such that the motor generates electricity when the remaining electric charge of the battery determined by the detector during vehicle movement is less than the predetermined value.

In some embodiments, the power transmitting apparatus for a hybrid vehicle can comprise a battery for driving the motor and a detector for determining a remaining electric charge of the battery. The driving force of the engine to the driving wheels can be cut off and the driving force of the engine can be simultaneously transmitted to the motor such that the motor generates electricity when the remaining electric charge of the battery determined by detector while the vehicle is stopped is less than the predetermined value.

In some embodiments, the driving force of the engine can be transmitted to the driving wheels and the driving force of the motor to the driving wheels can be simultaneously cut off on start-up under a low environmental temperature or during operation of the vehicle at high speed.

In some embodiments, an automatic transmission can be operatively positioned in the power transmitting system between the first and second clutches and the driving wheels and the speed of a vehicle can be changed by the automatic transmission. The automatic transmission can be, for example, a continuously variable transmission, a double-clutch-type transmission, or a single-clutch-type transmission. Other types of transmissions also could be used.

In some embodiments, a damper mechanism for damping a torque variation can be arranged operatively between a power transmitting system between the engine and the first clutch.

In some embodiments, the power transmitting apparatus for a hybrid vehicle can comprise an electrically driven oil pump, and that the first and second clutches can be activated by the hydraulic pressure generated by the electrically driven oil pump.

In embodiments wherein driving force can be transmitted between the engine and the motor while the vehicle is stopped without transmission of driving force to the driving wheels the driving force of engine E can be transmitted to the motor M or reversely the driving force of motor M can be transmitted to the engine E when the vehicle is stopped while avoiding transmission of the driving force of either of them to the driving wheels D such that the vehicle remains stopped. Accordingly, in some embodiments, a stopped engine can be started without requiring any starter and, the battery can be charged on more opportunities because the motor can be used to generate electricity while the vehicle is stopped, or both.

In embodiments wherein the first clutch, the second clutch and two hydraulic pistons corresponding to the first and second clutch are arranged within a same housing, and the first and second clutch can be operated in a selective manner by controlling the hydraulic pressure for actuating the hydraulic pistons, the structure of the power transmitting apparatus can be simplified and the size and weight of whole the power transmitting apparatus can be reduced.

In embodiments wherein the second clutch is activated to transmit the driving force of the motor to the driving wheels and the first clutch is simultaneously deactivated to cut off the driving force of the engine to the driving wheels on start-up and vehicle movement driven by the motor, the efficiency of operation by the motor can be improved.

In embodiments wherein the motor can be reversed on reverse start-up and reverse-direction operation of the vehicle driven by the motor, reverse gears etc. of a transmission can be eliminated and, thus, the structure of the power transmitting apparatus can be simplified and the size of the power transmitting apparatus can be reduced.

In embodiments wherein the power transmitting apparatus for a hybrid vehicle further comprises a battery for driving the motor and a detector for determining a remaining electric charge of the battery, and the driving forces of both the engine and the motor can be simultaneously transmitted to the driving wheels by activating both the first and second clutches so long as the remaining electric charge of the battery determined by the detector is within a particular range, the driving force of the engine can be reduced and the fuel economy can be improved.

In embodiments wherein the power transmitting apparatus for a hybrid vehicle further comprises a battery for driving the motor and a detector for determining a remaining electric charge of the battery, and the driving force of the engine can be transmitted both to the driving wheels and the motor such that the motor generates electricity when the remaining electric charge of the battery determined by the detector during vehicle movement is less than the predetermined value, the motor can advantageously generate electricity to charge the battery during vehicle movement.

In embodiments wherein the power transmitting apparatus for a hybrid vehicle further comprises a battery for driving the motor and a detector for determining a remaining electric charge of the battery, and the driving force of the engine to the driving wheels can be cut-off and the driving force of the engine can be simultaneously transmitted to the motor such that the motor generates electricity when the remaining electric charge of the battery determined by the detector while the vehicle is stopped is less than the predetermined value, the motor can generate electricity using the driving force of the engine with reduced friction, thereby improving the efficiency of charging the battery.

In embodiments wherein the driving force of the engine can be transmitted to the driving wheels and the driving force of the motor to the driving wheels is simultaneously cut off on start-up under a low environmental temperature or during vehicle operation at high speed, the vehicle can be prevented from being started-up by the motor when low environmental temperatures diminish the battery's power output and the motor can be prevented from acting as a resistance against vehicle movement during a high speed operation by isolating the motor from the power transmitting system.

In embodiments wherein an automatic transmission is operatively positioned in a power transmitting system between the first and second clutches and the driving wheels and the vehicle's speed can be changed by the automatic transmission, the gear ratio can be changed by the automatic transmission based on the vehicle operating conditions and thus adjust the driving force or engine speed.

In embodiments wherein the transmission is a continuously variable transmission, the gear ratio can be changed by the continuously variable transmission based on the vehicle operating conditions and thus continuously adjust the driving force or engine speed.

In embodiments wherein the transmission is a double-clutch-type transmission, the gear ratio can be changed by the double-clutch-type transmission based on the vehicle operating conditions and thus adjust the driving force or engine speed.

In embodiments wherein the transmission is a single-clutch type-transmission, the gear ratio can be changed by the single-clutch-type transmission based on the vehicle operating conditions and thus adjust the driving force or engine speed.

In embodiments wherein an additional clutch is arranged at a radially inner side of a rotor of the motor, the additional clutch can be added without increasing the axial dimension of the power transmitting apparatus.

In embodiments wherein a damper mechanism for damping a torque variation is operatively positioned in the power transmitting system between the engine and the first clutch, the driving force of the engine can be transmitted to the first clutch while suppressing torque variation.

In embodiments wherein the power transmitting apparatus for a hybrid vehicle further comprises an electrically driven oil pump, and the first and second clutches are activated by hydraulic pressure generated by the electrically driven oil pump, the first and second clutches can be actuated by operating the electrically driven oil pump when a mechanical pump of the vehicle cannot be operated under conditions such as during motor-powered start-up while the vehicle is stopped.

BRIEF DESCRIPTION OF THE DRAWINGS

FIG. 9 is a table illustrating the contents of control program of a selecting device in the power transmitting apparatus for a hybrid vehicle of FIG. 1.

FIG. 12 is a table illustrating contents of control program of the selecting device in the power transmitting apparatus for a hybrid vehicle of FIG. 11.

FIG. 15 is a table illustrating contents of control program of the selecting device in the power transmitting apparatus for a hybrid vehicle of FIG. 14.

DETAILED DESCRIPTION OF THE PREFERRED EMBODIMENT

Figure 1:
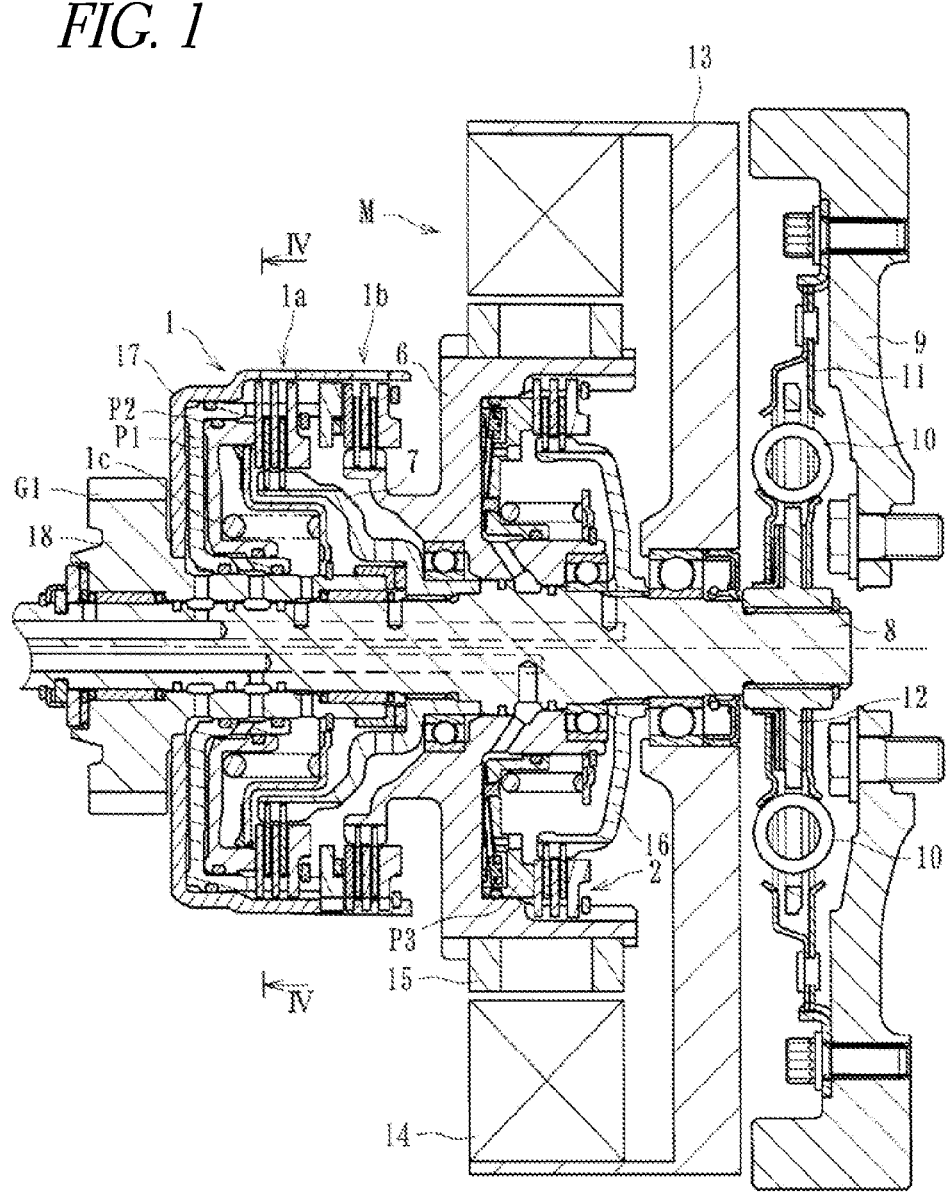
FIG. 1 is a longitudinal-section view illustrating the power transmitting apparatus for a hybrid vehicle according to a first embodiment.
Figure 2:
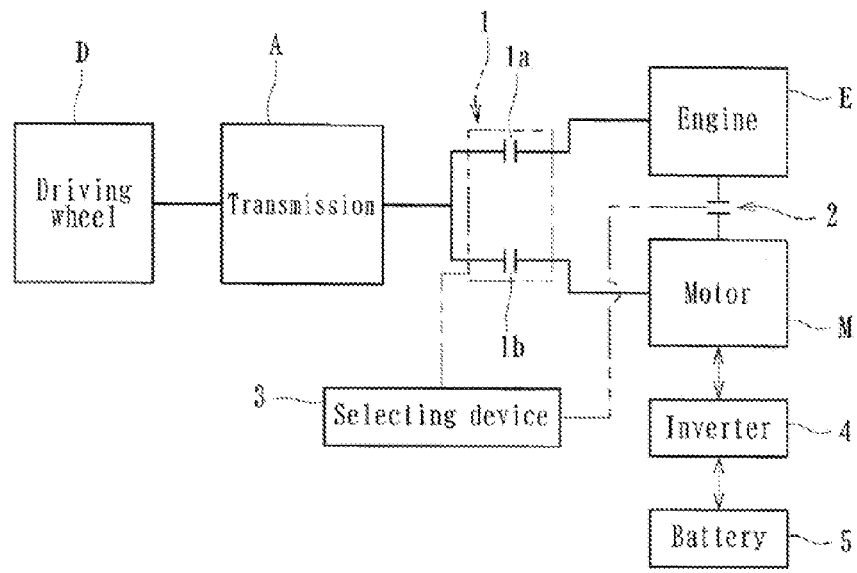
FIG. 2 is a schematic block diagram illustrating the power transmitting apparatus of FIG. 1.

An embodiment of a power transmitting apparatus can be configured to transmit or disconnect the driving force of an engine E and motor M for a hybrid vehicle to or from the wheels (driving wheels) D. Such an apparatus can comprise, as illustrated in FIGS. 1 and 2, an engine clutch 1*a*, a motor clutch 1*b*, a direct-link clutch 2, and a selecting device 3. FIG. 1 is a longitudinal-section view illustrating a main part of the power transmitting apparatus for a hybrid vehicle according to a first embodiment, and FIG. 2 is a schematic diagram of the power transmitting apparatus of FIG. 1.

As shown in FIG. 2, the power transmitting apparatus of the first embodiment comprises a engine clutch 1*a* operatively positioned in a power transmission system between the engine E mounted on a hybrid vehicle and driving wheels D and configured to transmit or cut-off the driving force of the engine E to or from the driving wheels (D), a motor clutch 1*b* operatively positioned in the power transmission system between a motor M mounted on a vehicle and the driving wheels D and configured to transmit or cut-off the driving force of the motor M to or from the driving wheels D, and a transmission A. The engine and motor clutches 1*a*, 1*b* main clutch 1 together form a main clutch 1.

FIG. 1 illustrates input members 9, 11 and 12, which are rotated by the engine E, and a damper mechanism 10 that comprises coil springs and is interposed between the input members 11 and 12. The input members 9, 11 are rotated by the driving force of the engine E and the driving force of engine E is transmitted to the input member 12 via the damper mechanism 10 to rotate a driving shaft 8, which is spline-engaged with the input member 12. The driving shaft 8 is connected to a rotor 7 configured to be rotated by the driving shaft 8.

The motor M is connected to an inverter 4 and a battery 5 and configured to be rotated by electric power supplied by the battery 5 and to be rotated by the engine E to generate electricity for charging the battery 5. The motor M comprises a stator 14 supported by a supporting member 13 and a rotor 15 supported by a rotor 6 configured to be rotated around the driving shaft 8 together with the rotor 15 by electric power supplied by the battery 5.

Figure 3:
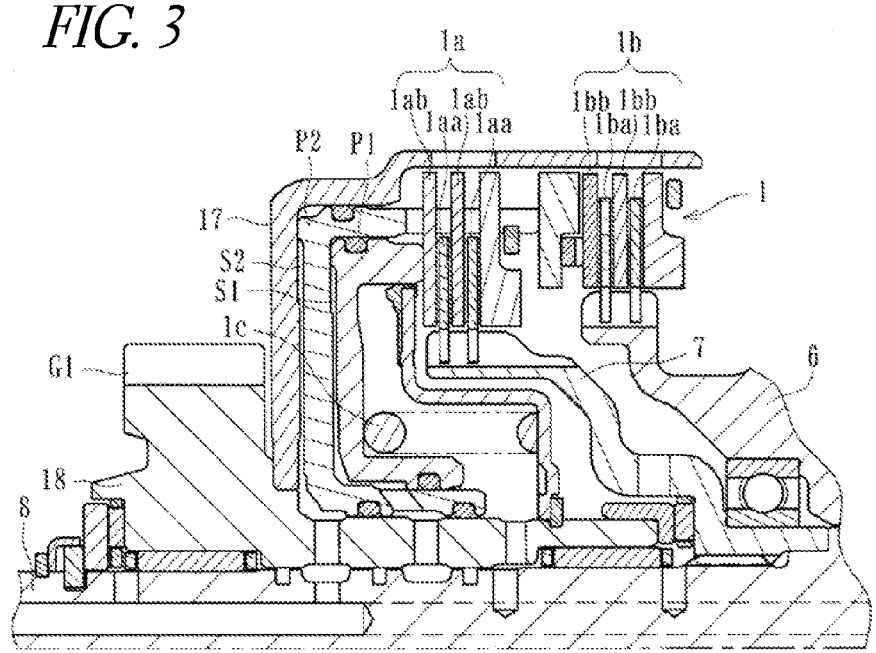
FIG. 3 is an enlarged view illustrating a clutch (an engine clutch and a motor clutch in an deactivated state) of the power transmitting apparatus of FIG. 1.
Figure 6:
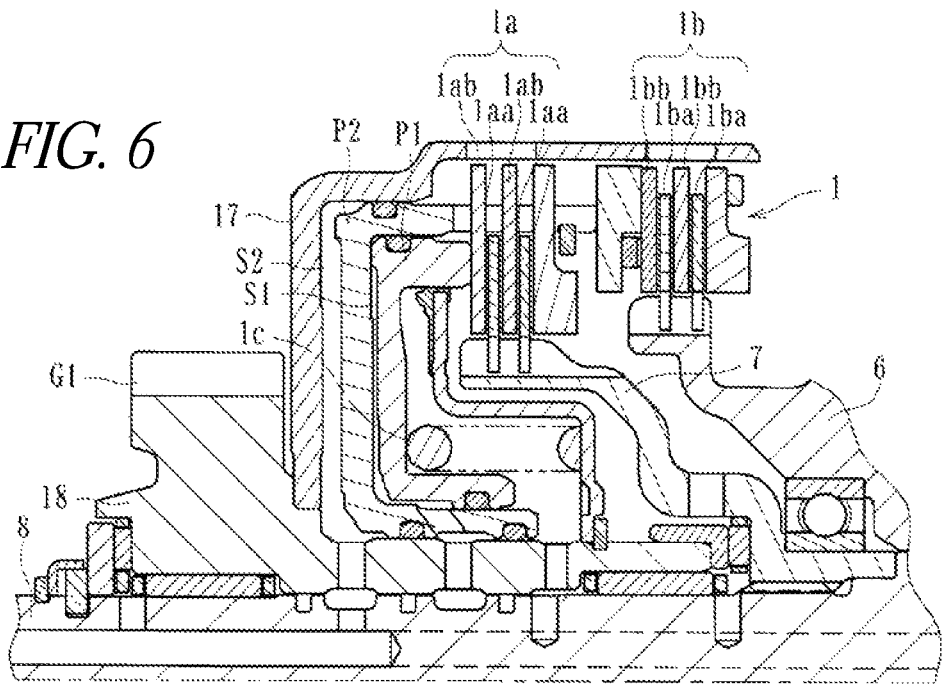
FIG. 6 is an enlarged view of the clutch of the power transmitting apparatus of FIG. 1 illustrating a state in which only the engine clutch is activated.

As shown in FIG. 3, the engine clutch 1*a* can comprise a plurality of driving-side clutch discs 1*aa* mounted on the rotor 7, which is rotated by the engine E, and a plurality of driven-side clutch discs 1*ab* mounted on a housing 17. These driving-side clutch discs 1*aa* and driven-side clutch discs 1*ab* are alternatingly arranged relative to each other to form a laminated structure and can be pressed against and separated from each other. FIG. 6 illustrates the engine clutch 1*a* in an activated state wherein the driving-side clutch discs 1*aa* and the driven-side clutch discs 1*ab* are pressed against each other.

Figure 7:
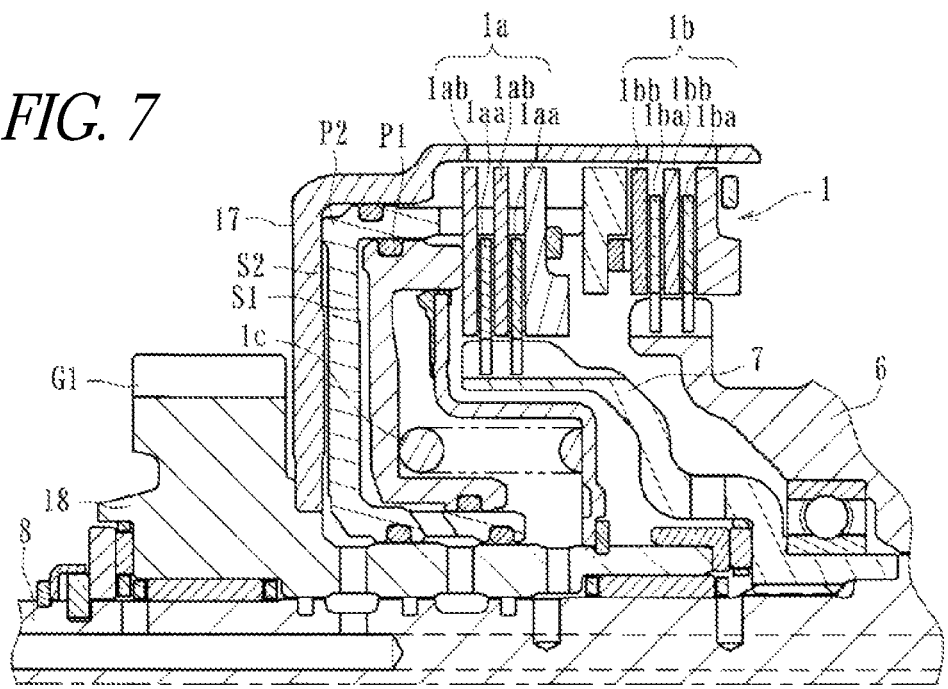
FIG. 7 is an enlarged view of the clutch of the power transmitting apparatus of FIG. 1 illustrating a state in which only the motor clutch is activated.

The motor clutch 1*b*, as illustrated in FIG. 3, can comprise a plurality of driving-side clutch discs 1*ba* mounted on the rotor 6 to rotate together with the motor M and a plurality of driven-side clutch discs 1*bb* mounted on the housing 17. The driving-side clutch discs 1*ba* and the driven-side clutch discs 1*bb* are alternatingly arranged relative to each other to form a laminated structure and can be pressed against and separated from each other. FIG. 7 illustrates the motor clutch 1*b* in an activated state wherein the driving-side clutch discs 1*ba* and the driven-side clutch discs 1*bb* are pressed against each other. The term "separated" used herein means a condition released from a pressure applied to the clutch discs and is not limited only to a physically separated condition. The driving force is transmitted when the discs are pressed together and the driving force is disconnected when the discs are separated.

As shown in FIG. 3 the main clutch 1 can comprise the engine clutch 1*a*, the motor clutch 1*b* and two hydraulic pistons P1 and P2 corresponding respectively to the engine and motor clutches 1*a*, 1*b* contained in a same housing 17. The engine and motor clutches 1*a*, 1*b* can be selectively activated by controlling the hydraulic pressure for actuating the hydraulic pistons P1, P2.

Figure 4:
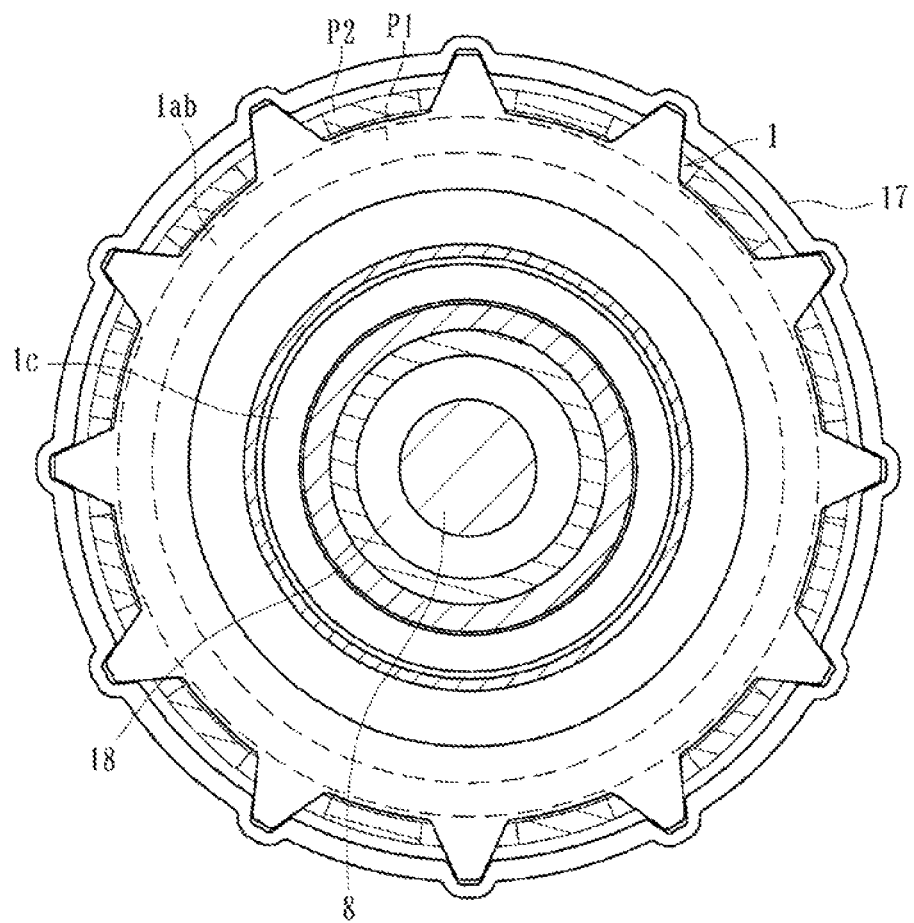
FIG. 4 is a cross-sectional view taken along a line IV-IV of FIG. 1.

The hydraulic piston P2 can be moved toward the right as illustrated in FIG. 3 against an urging force of a return spring 1c by injecting operating oil into a hydraulic chamber S2 between the housing 17 and the hydraulic piston P2 and thus the motor clutch 1b is pressed by tips formed on the hydraulic piston P2 to press the driving-side clutch discs 1ba and the driven-side clutch discs 1bb against each other. The tips formed on the hydraulic piston P2 can be passed through recesses on the peripheries of the driving-side clutch discs 1aa and the driven-side clutch discs 1ab of the engine clutch 1a as shown in FIG. 4.

The hydraulic piston P1 can be moved toward the right as illustrated in FIG. 3 against an urging force of a return spring 1c by injecting operating oil into a hydraulic chamber S1 between the hydraulic piston P1 and the hydraulic piston P2 and thus the engine clutch 1a is pressed by tips formed on the hydraulic piston P1 to press the driving-side and driven-side clutch discs 1aa, 1ab against each other. Thus, the engine clutch 1a and the motor clutch 1b can be selectively activated by controlling the hydraulic pressures operating the hydraulic pistons P1 and P2 respectively.

The housing 17 forming part of the main clutch 1 can be connected to an interlocking member 18 formed thereon with a gear G1 mating with a gear formed on an output shaft (not shown). Thus, the driving force of the engine E or motor M transmitted through the engine or motor clutches 1a or 1b can be transmitted to the interlocking member 18 through the housing 17 and further transmitted to the transmission A via the output shaft.

The selecting device 3 selectively activates the engine clutch 1a or the motor clutch 1b by properly selected operation of the hydraulic pistons P1, P2 through injection of operating oil at a predetermined pressure into the hydraulic chamber S1 or S2 based on vehicle operating conditions to change among various power transmission modes, such using the engine E as a driving power source, using the motor M as a driving power source, or using both the motor M and engine E as a driving power source. Such a selecting device 3 can be, for example, an Electronic Control Unit (ECU) for controlling the engine E or motor M.

The power transmitting apparatus for a hybrid vehicle of the first embodiment can cut-off power transmission from the engine E and motor M to the driving wheels D and transmit driving force from one of the engine E and motor M to the other of them by directly connecting them to each other. More particularly, the power transmitting apparatus of the first embodiment is equipped with the direct-link clutch 2 operatively positioned between the engine E and the motor M while bypassing the engine and motor clutches 1a, 1b (i.e. so as to be able to directly connect the engine E and the motor M) and is able to transmit driving force from one of the engine E and motor M to the other of them.

Figure 5:
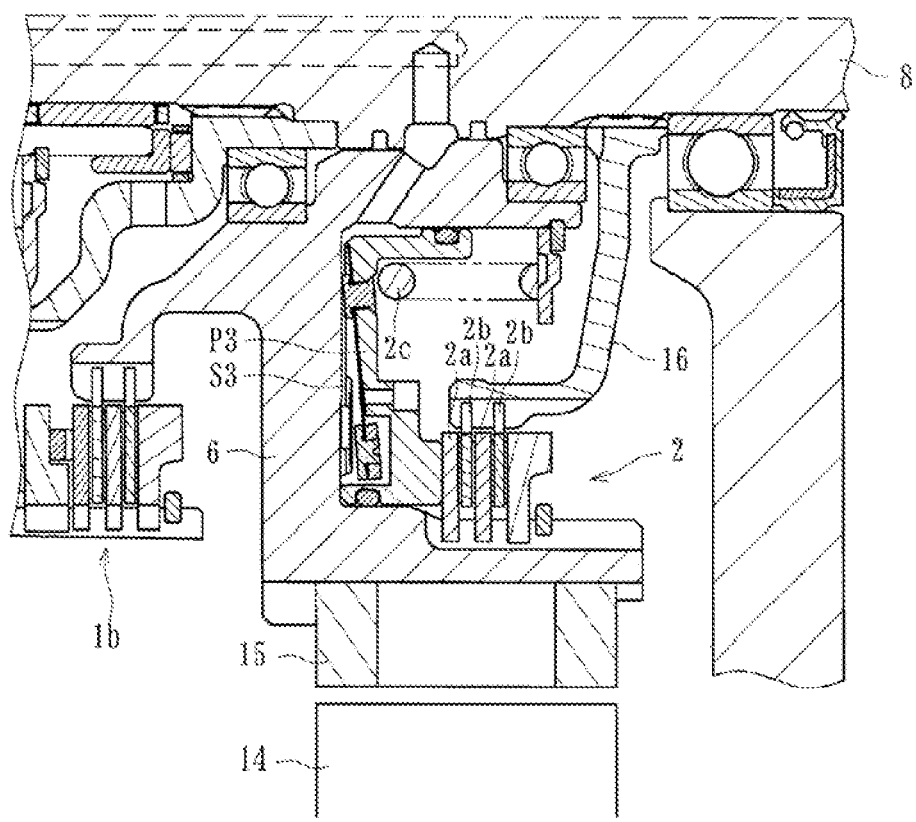
FIG. 5 is an enlarged view illustrating a direct-link clutch (in a deactivated condition) of the power transmitting apparatus of FIG. 1.
Figure 8:
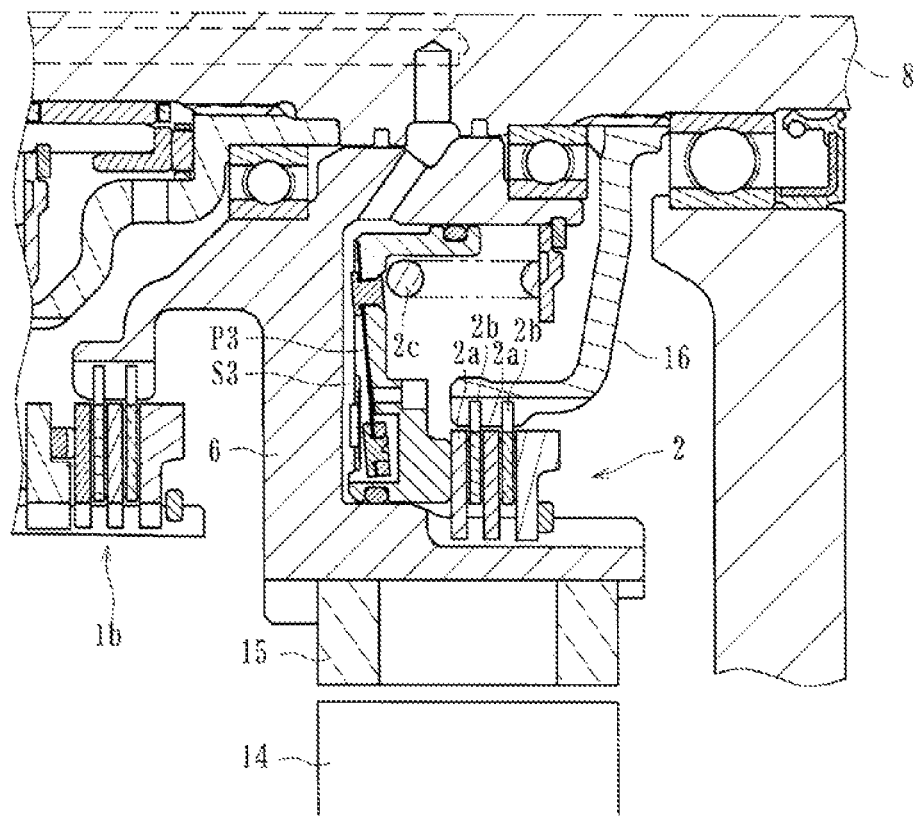
FIG. 8 is an enlarged view of the clutch of the power transmitting apparatus of FIG. 1 illustrating a state in which only the direct-link clutch is activated.

As shown in FIG. 5 the direct-link clutch 2 can be located at a radially inner side (inside) of the rotor 15 of the motor M and can comprise driving-side clutch discs 2a mounted on the rotor 6, which is rotatable together with the motor M, and driven-side clutch discs 2b mounted on the connecting member 16 connected to the driving shaft 8. These driving-side clutch discs 2a and driven-side clutch discs 2b are alternatingly arranged relative to each other to form a laminated structure and can be pressed against and separated from each other. FIG. 8 illustrates direct-link clutch 2 in an activated state wherein the driving-side clutch discs 2a and the driven-side clutch discs 2b are pressed against each other.

As shown in FIG. 5 the direct-link clutch 2 can have a hydraulic piston P3, which can be activated by controlling the hydraulic pressure for actuating the hydraulic piston P3. That is, the hydraulic piston P3 is moved toward the right as illustrated in FIG. 5 against an urging force of a return spring 2c by injecting operating oil into a hydraulic chamber S3 between the rotor 6 and the hydraulic piston P3 and thus the direct-link clutch 2 is pressed by tips formed on the hydraulic piston P3 to press the driving-side clutch discs 2a and the driven-side clutch discs 2b against each other.

Accordingly when the driving-side clutch discs 2a and the driven-side clutch discs 2b are pressed against each other by activation of the direct-link clutch 2, since the driving shaft 8 and the rotor 6 are connected, the engine E and the motor M are connected to each other and thus driving force of one of them can be transmitted to the other. In this case when the engine clutch 1a and the motor clutch 1b are not activated and accordingly the driving-side clutch discs 1aa and the driven-side clutch discs 1ab and the driving-side clutch discs 1ba and the driven-side clutch discs 1bb are separated, transmission of the driving force from both the engine E and the motor M to the driving wheels D can be cut-off.

The direct-link clutch 2 can be properly and selectively activated by the selecting device 3. FIG. 9 is a table illustrating control of the engine, motor and direct-link clutches 1a, 1b and 2 by the selecting device 3. As indicated in row (1) of the table of FIG. 9, the engine E in N (neutral) range of the transmission A can be started by the driving force from the motor M to the engine E without using any starter by deactivating both the engine and motor clutches 1a, 1b and activating the direct-link clutch 2.

In some embodiments, the power transmitting apparatus for a hybrid vehicle, can comprise means for detecting the remaining electric charge of the battery (not shown) (sometimes referred to herein as "remaining electric charge detecting means"). For example, the means for detecting the remaining electric charge of the battery can comprise circuitry to detect the terminal voltage of the battery, the current passing into and out of the battery, or both and hardware or software to determine the remaining electric charge of the battery based on the detected voltage, current, or both. For example, a circuit including a comparator and a reference diode can be used to determine when a detected voltage crosses a reference voltage.

As indicated in row (2) of the table of FIG. 9, when the remaining electric charge of the battery 5 detected by the remaining electric charge detecting means while the vehicle is stopped is less than a predetermined value, the motor M can generate electricity by cutting-off the driving force of the engine E to the driving wheels D and simultaneously transmitting the driving force of the engine E to the motor M while deactivating both the engine and motor clutches 1a, 1b and simultaneously activating the direct-link clutch 2.

As indicated in row (3) of the table of FIG. 9, when the transmission A is in a D (drive) range and the vehicle is in a starting-up or drive mode, the driving force of the motor M can be transmitted to the driving wheels D and the transmission of the driving force of the engine E to the driving wheels D is cut-off by deactivating both the engine and direct-link clutches 1a, 2 and activating the motor clutch 1b. As indicated in row (4), when starting the engine E in the drive D range, the engine E can be started by transmitting the driving force of the motor M to the engine E while deactivating the direct-link clutch 2 and activating both the engine and motor clutches 1a, 1b.

As indicated in row (5) of the table of FIG. 9, the driving forces of both the engine E and the motor M are simultaneously transmitted to the driving wheels D by activating both the engine and motor clutches 1a, 1b and deactivating the direct-link clutch 2 so long as the remaining electric charge of the battery 5 detected by the remaining electric charge detecting means is within a particular range.

As indicated in row (6) of the table of FIG. 9, when the remaining electric charge of the battery 5 detected by the remaining electric charge detecting means during vehicle operation is less than the predetermined value, the motor M can generate electricity by transmitting the driving force of the engine E both to the driving wheels D and the motor M by activating both the engine and motor clutches 1a, 1b and deactivating the direct-link clutch 2. As indicated in row (7), when a vehicle is being started under a low environmental temperature or in a high speed operating state, the driving force of the engine E can be transmitted to the driving wheels D and simultaneously the driving force of the motor M to the driving wheels D can be cut-off by activating the engine clutch 1a and de activating both the motor clutch 1b and the direct-link clutch 2.

As indicated in row (8) of the table of FIG. 9, the motor M can generate electricity by recovering power from the driving wheels D by cutting-off the driving power of the engine E to the driving wheels D while deactivating both the engine and direct-link clutches 1a, 2 and activating the motor clutch 1b during regenerative braking in D range of the transmission A. As indicated in row (9), reverse-direction start-up and reverse-direction operation can be performed by the motor M by reversely rotating the motor M and deactivating both the engine and direct-link clutches 1a, 2 and activating the motor clutch 1b.

As illustrated by the present embodiment, since the power transmitting apparatus can cut off power transmission from the engine E and the motor M to the driving wheels D while connecting the engine E and the motor M each other to transmit the power of one of them to the other the driving force of engine E can be transmitted to the motor M or reversely the driving force of motor M can be transmitted to the engine E when the vehicle is stopped while avoiding transmission of the driving force of either of them to the driving wheels D such that the vehicle remains stopped. Accordingly, in some embodiments, a stopped engine E can be started without requiring any starter, the battery can be charged on more opportunities because the motor can be used to generate electricity while the vehicle is stopped, or both.

In some embodiments, the structure of whole the power transmitting apparatus can be simplified and the size and weight of whole the power transmitting apparatus can be reduced since the engine clutch 1a, the motor clutch 1b and two hydraulic pistons P1, P2 corresponding to the engine and motor clutches 1a, 1b are arranged within a same housing 17, and the engine and motor clutches 1a, 1b can be operated in a properly selective manner by controlling the hydraulic pressure for actuating the hydraulic pistons P1, P2.

In embodiments wherein the motor clutch 1b is activated to transmit the driving force of the motor M to the driving wheels D and the engine clutch 1a is simultaneously deactivated to cut-off the driving force of the engine E to the driving wheels D on start-up and vehicle operation driven by the motor M, the drive efficiency of the motor M can be improved (see row (3) of the table of FIG. 9). In addition, since the motor M can be reversed on reverse start-up and reverse-direction operation of a vehicle driven by the motor M, reverse gears etc. of a transmission can be eliminated and thus the structure of the power transmitting device can be simplified and the size of the power transmitting apparatus can be reduced (see row (9) of the table of FIG. 9).

In embodiments wherein both the driving forces of the engine E and the motor M are simultaneously transmitted to the driving wheels D by activating both the engine and motor clutches 1a, 1b so long as the remaining electric charge of the battery detected by the remaining electric charge detecting means is within a particular range, the driving force of the engine E can be reduced and thus fuel economy can be improved (see row (5) of the table of FIG. 9).

In embodiments wherein the driving force of the engine E is transmitted both to the driving wheels D and the motor M such that the motor M generates electricity when the remaining electric charge of the battery 5 detected by the remaining electric charge detecting means during vehicle movement is less than the predetermined value, the motor M can generate electricity to charge the battery 5 during vehicle movement (see row (6) of the table of FIG. 9). In embodiments wherein the driving force of the engine E to the driving wheels D is cut-off and the driving force of the engine E is transmitted simultaneously to the motor M such that the motor M generates electricity when the remaining electric charge of the battery 5 detected by the remaining electric charge detecting means while the vehicle is stopped is less than the predetermined value, the motor M can generate electricity using the driving force of the engine E with reduced friction and thus more efficiently charge the battery 5 (see row (2) of the table of FIG. 9).

In embodiments wherein the driving force of the engine E is transmitted to the driving wheels D and the driving force of the motor M to the driving wheels D is simultaneously cut-off on start-up under a low environmental temperature or high speed run of a vehicle, the vehicle can be prevented from being started-up by the motor M when low environmental temperatures diminish the power output of the battery 5 and the motor M can be prevented from acting as a resistance against vehicle movement during a high speed operation by isolating the motor from the power transmitting system (see row (7) of the table of FIG. 9).

In embodiments wherein an automatic transmission A is operatively positioned in the power transmitting system between the engine and motor clutches 1a, 1b and the driving wheels D and the speed of a vehicle can be changed by the automatic transmission A, the gear ratio can be changed by the automatic transmission A in accordance with the vehicle operating conditions and thus adjust the driving force or engine speed. The automatic transmission may be a double-clutch-type transmission or a single-clutch-type transmission, for example. When using the double-clutch-type transmission, the gear ratio can be changed based on vehicle operating conditions and thus adjust the driving force or engine speed. When using the single-clutch-type transmission, the gear ration can be changed based on vehicle operating conditions and thus adjust the driving force or engine speed.

In embodiments wherein the direct-link clutch 2 is arranged at a radially inner side of a rotor 15 of the motor M, the direct-link clutch 2 can be added without increasing the axial dimension of the power transmitting apparatus. In embodiments wherein a damper mechanism for damping a torque variation is operatively positioned in the power transmitting system between the engine E and the engine clutch 1a, the driving force of the engine E can be transmitted to the engine clutch 1a while suppressing torque variation.

Figure 10:
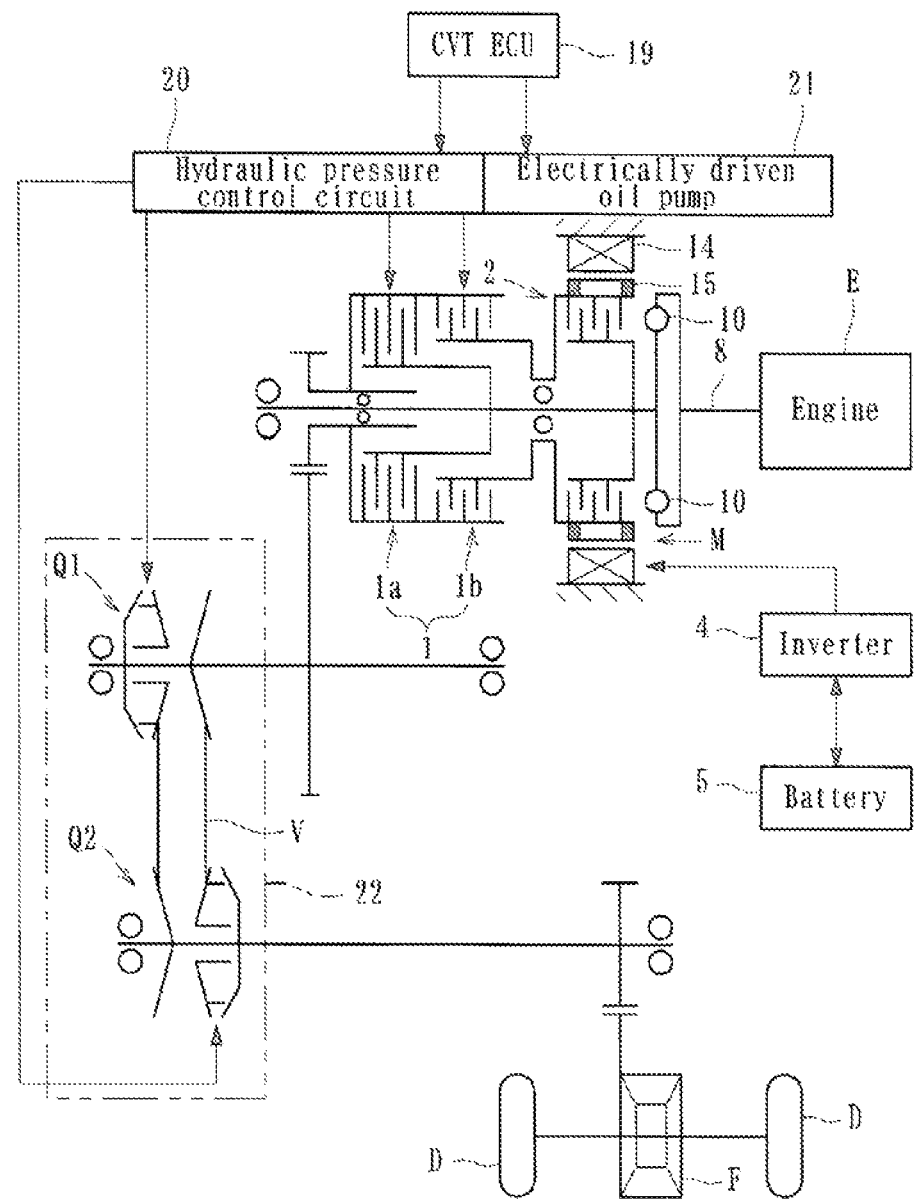
FIG. 10 is a block diagram illustrating the power transmitting apparatus and transmission for a hybrid vehicle of FIG. 1.

The transmission A can be a continuously variable speed transmission 22 (e.g. a Continuously Variable Transmission (CVT)) as illustrated in FIG. 10, for example. When included, the continuously variable speed transmission 22 can be operatively positioned in the power transmitting system between the main clutch 1 and the driving wheels D from the driving source (engine E and motor M) of a vehicle to the driving wheels D. Such a continuously variable speed transmission 22 can comprise two pulleys Q1, Q2 and a belt V extending therebetween. The speed can be adjusted by independently changing diameters of the pulleys Q1, Q2 on which the belt V runs by a hydraulic pressure control circuit 20. The vehicle can comprise a differential gear F, as illustrated in FIG. 10.

The continuously variable speed transmission 22 can comprise a CVT ECU 19 electrically connected to a brake switch of a brake pedal, a position sensor for detecting the position of a shifting lever, an engine ECU (not shown) etc. and a hydraulic control circuit 20, which is controlled by the CVT ECU 19. The hydraulic pistons P1-P3 previously described also can be controlled by the hydraulic pressure control circuit 20. When a vehicle is equipped with the continuously variable speed transmission 22 as the automatic transmission A, the gear ratio can be changed based on with the vehicle operating conditions and thus continuously adjust the driving force or engine speed.

An electrically driven oil pump 21 can generate pressure to activate the engine clutch 1a, motor clutch 1b or direct-link clutch 2. This makes it possible to activate the engine and motor clutches 1a, 1b and direct-link clutch 2 even if the mechanical pump mounted on a vehicle cannot be operated e.g. on motor start-up while the vehicle is stopped.

Figure 11:
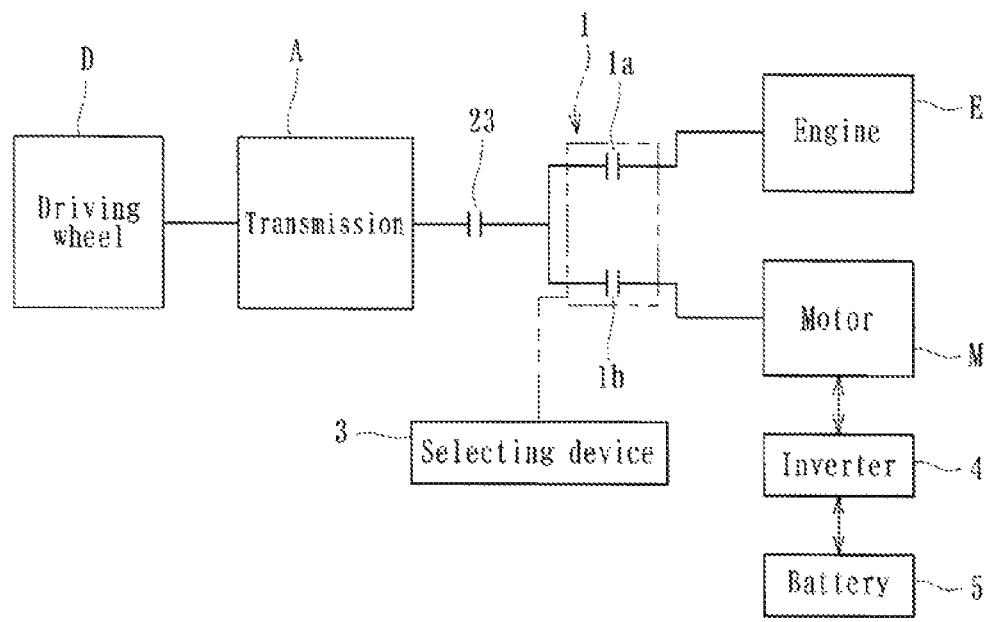
FIG. 11 is a block diagram illustrating the power transmitting apparatus for a hybrid vehicle according to a second embodiment.
Figure 13:
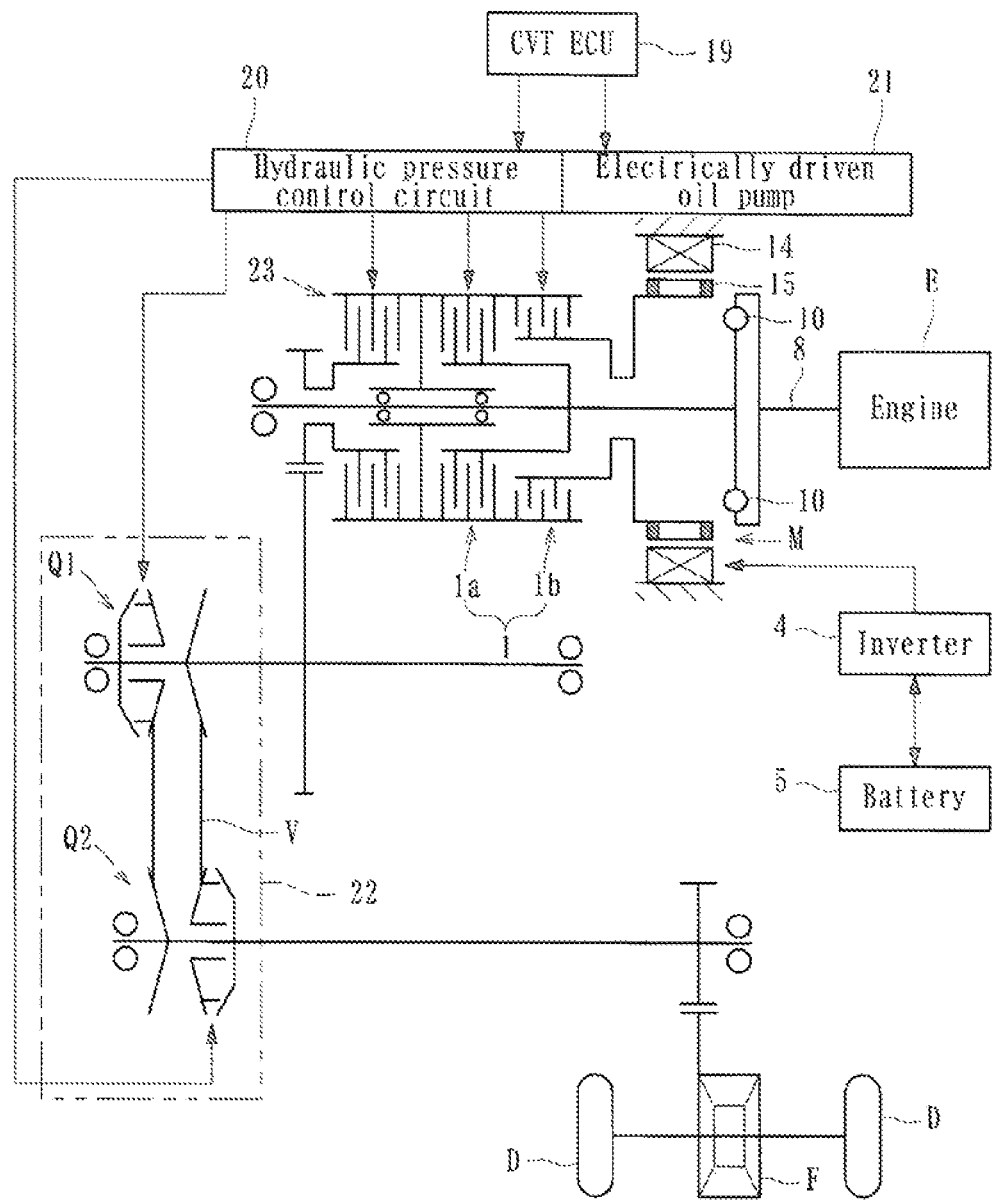
FIG. 13 is a block diagram illustrating the power transmitting apparatus and transmission for a hybrid vehicle of FIG. 11.

A second embodiment of a power transmitting apparatus for a hybrid vehicle is illustrated in FIGS. 11-13. Similar to the first embodiment, the power transmitting apparatus of this second embodiment can transmit or cut-off driving force of the engine E and the motor M as power source for a hybrid vehicle to the driving wheels D and has an intermediate clutch 23, as shown in FIG. 11, between the output side of the engine and motor clutches 1a, 1b and the transmission A mounted on a vehicle and configured to transmit or cut-off driving force of the engine E or the motor M to the transmission A. The same reference numerals are used in connection with this embodiment as the first embodiment for designating the same or similar structural elements as those used in the first embodiment. Therefore, repetition of detailed description of those elements is omitted from the description of the second embodiment.

This second embodiment can cuts-off power transmission from the engine E and the motor M to the driving wheels D and can connect the engine E and the motor M to transmit the power from one of them to the other. The intermediate clutch 23 can cut-off power transmission from the engine E and the motor M to the driving wheels D and the engine and motor clutches 1a, 1b can connect the engine E and the motor M to transmit the power from one of them to the other.

The intermediate clutch 23 can be selectively activated by the selecting device 3. The table of FIG. 12 illustrates control of the engine and motor clutches 1a, 1b and the intermediate clutch 23 by the selecting device 3. FIG. 13 illustrates the transmission A as a continuously variable speed transmission (CVT) 22. When a vehicle is equipped with the continuously variable speed transmission 22 as the automatic transmission A, the gear ratio can be changed based on with the vehicle operating conditions and thus continuously adjust the driving force or engine speed.

Similar to the first embodiment, since this second embodiment can cut off power transmission from the engine E and the motor M to the driving wheels D while connecting the engine E and the motor M to transmit power from one of them to the other, the driving force of engine E can be transmitted to the motor M or reversely the driving force of motor M can be transmitted to the engine E when the vehicle is stopped while avoiding transmission of the driving force of either of them to the driving wheels D such that the vehicle remains stopped. Accordingly, in some embodiments, a stopped engine E can be started without requiring any starter, the battery can be charged on more opportunities because the motor can be used to generate electricity while the vehicle is stopped, or both.

Figure 14:
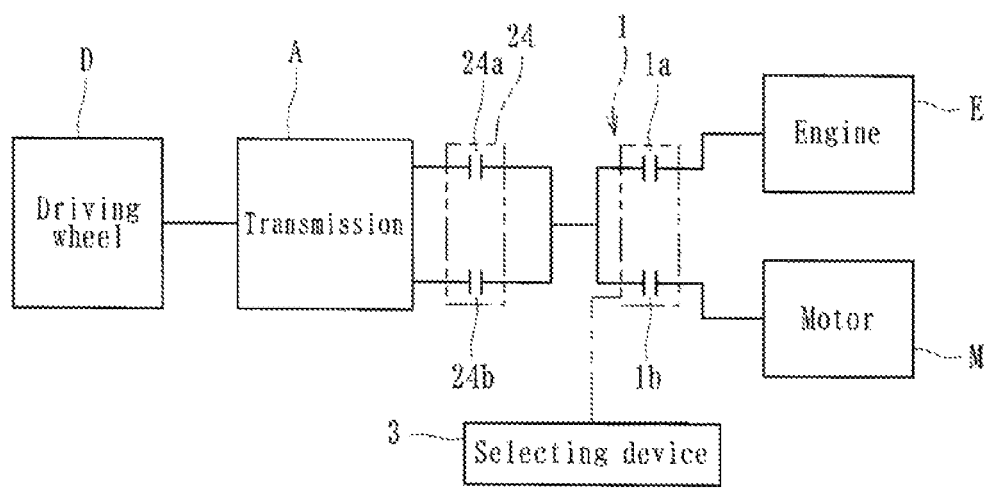
FIG. 14 is a block diagram illustrating the power transmitting apparatus for a hybrid vehicle according to a third embodiment.
Figure 16:
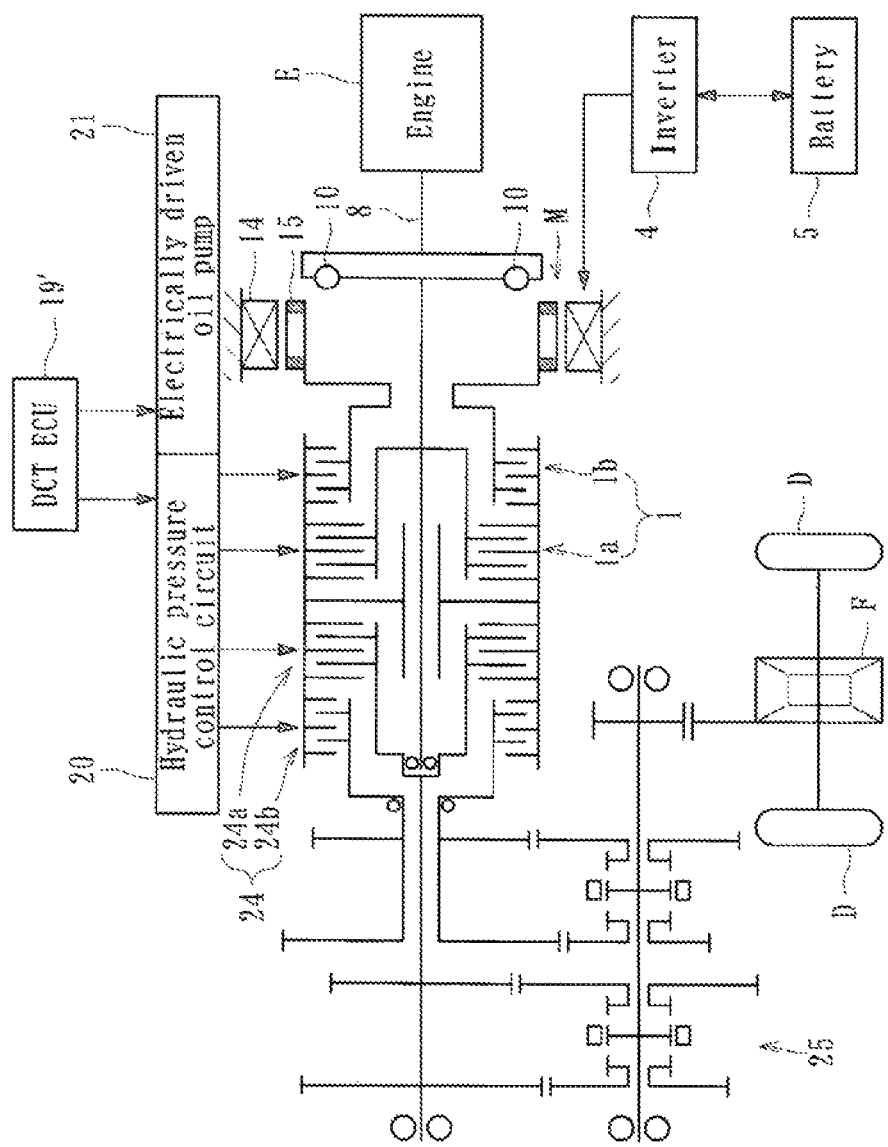
FIG. 16 is a block diagram illustrating the power transmitting apparatus and transmission for a hybrid vehicle of FIG. 14.

A third embodiment of a power transmitting apparatus for a hybrid vehicle is illustrated in FIGS. 14-16. Similar to the first and second embodiments the power transmitting apparatus, this third embodiment can transmit or cut off driving force of the engine E and the motor M as the power source for a hybrid vehicle to the driving wheels D and has an intermediate clutch 24 between the output side of the engine and motor clutches 1a, 1b and the transmission A mounted on a vehicle and configured to transmit or cut-off the driving force of the engine E or the motor M to the transmission A. The intermediate clutch 24 can comprise an odd clutch for odd numbered gear 24a and an even clutch for even numbered gear 24b. The same reference numerals are used in connection with this embodiment as the first and second embodiments for designating the same or similar structural elements as those used in the first and second embodiments. Therefore, repetition of detailed description of those elements is omitted from the description of this third embodiment.

This third embodiment can cut off power transmission from the engine E and the motor M to the driving wheels D while connecting the engine E and the motor M to transmit power from one of them to the other. That is, the intermediate clutch 24 (the odd clutch for the odd numbered gear 24a and the even clutch for the even numbered gear 24b) can cut off power transmission from the engine E and the motor M to the driving wheels D and the engine and motor clutches 1a, 1b can connect the engine E and the motor M to transmit the power from one of them to the other.

The intermediate clutch 24 (the odd clutch for the odd numbered gear 24a and the even clutch for the even numbered gear 24b) can be selectively activated by the selecting device 3. The table of FIG. 15 illustrates control of the engine and motor clutches 1a, 1b and intermediate clutch 24 by the selecting device 3. FIG. 16 illustrates the transmission A as a Dual Clutch Transmission (DCT) 25 equipped with transmissions for the odd and even numbered gears. The vehicle can comprise a DCT ECU 19'.

Similar to the first and second embodiments, since this third embodiment can cut off power transmission from the engine E and the motor M to the driving wheels D while connecting the engine E and the motor M to transmit power from one of them to the other, the driving force of engine E can be transmitted to the motor M or reversely the driving force of motor M can be transmitted to the engine E when the vehicle is stopped while avoiding transmission of the driving force of either of them to the driving wheels D such that the vehicle remains stopped. Accordingly, in some embodiments, a stopped engine E can be started without requiring any starter, the battery can be charged on more opportunities because the motor can be used to generate electricity while the vehicle is stopped, or both.

Figure 17:
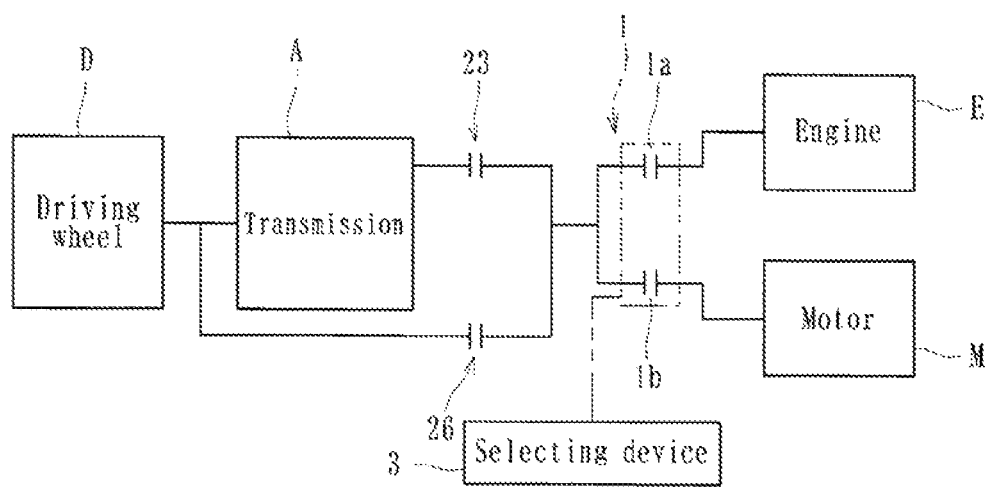
FIG. 17 is a block diagram illustrating the power transmitting apparatus for a hybrid vehicle according to a fourth embodiment.
Figure 18:
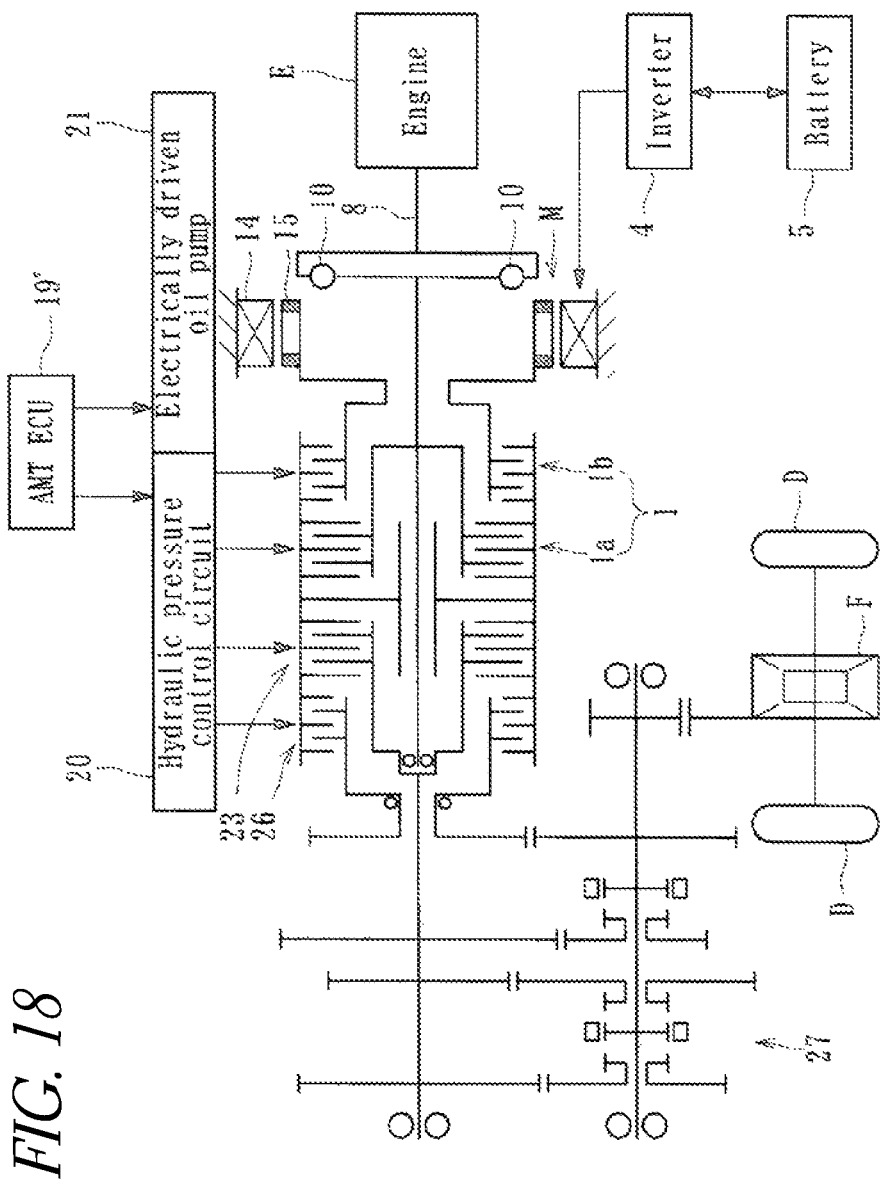
FIG. 18 is a block diagram illustrating the power transmitting apparatus and transmission for a hybrid vehicle of FIG. 17.

A fourth embodiment of a power transmitting apparatus for a hybrid vehicle is illustrated in FIGS. 17 and 18. Similar to the first, second, and third embodiments of the power transmitting apparatus, this fourth embodiment can transmit or cut-off the driving force of the engine E and the motor M as the power source for a hybrid vehicle to the driving wheels D. As illustrated in FIG. 17, the fourth embodiment can comprise a bypass clutch 26 in addition to the intermediate clutch 23 (see the description above in connection with the second embodiment) between the output side of the engine and motor clutches 1a, 1b and the transmission A mounted on a vehicle and configured to transmit or cut-off the driving force of the engine E or the motor M to or from the transmission A. The bypass clutch 26 is operatively positioned between the output side of the engine and motor clutches 1a, 1b and the driving wheels D such that the transmission A is bypassed and is configured to transmit and cut-off the driving force of the engine E or motor M to or from the driving wheels D without passing through the transmission A. The same reference numerals are used in connection with this embodiment as the first, second, and third embodiments for designating the same or similar structural elements as those used in the first, second, and third embodiments. Therefore, repetition of detailed description of those elements is omitted from the description of this fourth embodiment.

This fourth embodiment can cuts off power transmission from the engine E and the motor M to the driving wheels D while connecting the engine E and the motor M to transmit power from one of them to the other. That is, the intermediate clutch 23 and bypass clutch 26 can cut-off power transmission from the engine E and the motor M to the driving wheels D and the engine and motor clutches 1a, 1b can connect the engine E and the motor M to transmit the power from one of them to the other.

The intermediate clutch 23 and bypass clutch 26 can be selectively activated by the selecting device 3. FIG. 18 illustrates the transmission A as a three-speed Automatic Manual transmission (AMT) 27. The vehicle can comprise an AMT ECU 19".

Similar to the first, second, and third embodiments, since this fourth embodiment can cut off power transmission from the engine E and the motor M to the driving wheels D while connecting the engine E and the motor M to transmit power from one of them to the other, the driving force of engine E can be transmitted to the motor M or reversely the driving force of motor M can be transmitted to the engine E when the vehicle is stopped while avoiding transmission of the driving force of either of them to the driving wheels D such that the vehicle remains stopped. Accordingly, in some embodiments, a stopped engine E can be started without requiring any starter, the battery can be charged on more opportunities because the motor can be used to generate electricity while the vehicle is stopped, or both.

Although certain embodiments have been described above, the present inventions are not limited to the foregoing description and what is shown in the accompanying drawings. For example the power transmitting apparatus may be constructed using other types of clutches in place of the direct-link, intermediate, and bypass clutches if they can connect the engine E and the motor M and transmit power from one of them to the other. The inventive features disclosed herein can be applied to any type of hybrid vehicle equipped with a internal combustion engine, including not only a gasoline engine but also a diesel engine, for example. Furthermore, although in certain exemplifying embodiments the selecting device 3 can be formed in the ECU, the selecting device can be formed in a separately arranged microcomputer in some embodiments.

The features disclosed herein can be applied to power transmitting apparatuses having different configurations in its external appearance or structural parts or those having additional functions than those disclosed in connection with the provided exemplifying embodiments.

What is claimed is:

1. A power transmitting apparatus for a hybrid vehicle, comprising:
a first clutch operatively positioned in a power transmission system between an engine mounted on a vehicle and driving wheels and configured to transmit or cut off driving force of the engine to or from the driving wheels;
a second clutch operatively positioned in a power transmission system between a motor mounted on a vehicle to the driving wheels and configured to transmit or cut off driving force of the motor to or from the driving wheels, the first and second clutches being operated based on vehicle operating conditions to connect the engine and the motor to transmit power from one of the engine and the motor to the other while cutting off power transmission from the engine and the motor to the driving wheels;
a third clutch operatively positioned between an output side of the first and second clutches and a transmission having gears and mounted on the hybrid vehicle and configured to transmit or cut-off the driving force between the engine or the motor and the transmission, the third clutch including an odd clutch configured to transmit or cut-off power to odd numbered gears of the transmission and an even clutch configured to transmit or cut-off power to even numbered gears of the transmission;
a selecting device for transitioning the power transmitting apparatus between a hybrid mode and an engine mode; and
a return spring configured to bias both the first and second clutches to a disconnected state;
wherein the power transmitting apparatus operates the first clutch, the second clutch, the odd clutch, and the even clutch when the power transmitting apparatus changes a gear ratio of the transmission while operating in the hybrid mode;
wherein the second clutch cuts off the motor from the driving wheels and the power transmitting apparatus operates the first clutch, the odd clutch, and the even clutch when the power transmitting apparatus changes the gear ratio of the transmission while operating in the engine mode;
wherein the third clutch transmits or cuts off all driving force from the first and second clutches to the transmission;
wherein the first clutch, the second clutch and hydraulic pistons corresponding to each of the first and second clutch are arranged within a same housing, and wherein the first and second clutch can be operated in a selective manner by controlling a hydraulic pressure for actuating the hydraulic pistons; and
wherein the first and second clutches each include driven-side clutch discs mounted on the same housing.

2. The power transmitting apparatus for a hybrid vehicle of claim 1, further comprising an additional clutch operatively positioned between the engine and the motor such that the first and second clutches are bypassed and configured to transmit or cut off the driving force from one of the engine and the motor to the other of them.

3. The power transmitting apparatus for a hybrid vehicle of claim 2, wherein the additional clutch is arranged at a radially inner side of a rotor of the motor.

4. The power transmitting apparatus for a hybrid vehicle of claim 1, further comprising yet another clutch operatively positioned between the output side of the first and second clutch and the driving wheels to bypass the transmission mounted on the vehicle and configured to transmit or cut off the driving force of the engine or the motor to or from the driving wheels without passing through the transmission.

5. The power transmitting apparatus for a hybrid vehicle of claim 1, wherein the second clutch is activated to transmit the driving force of the motor to the driving wheels and simultaneously the first clutch is deactivated to cut-off the driving force of the engine to the driving wheels on start-up and operation of the vehicle driven by the motor.

6. The power transmitting apparatus for a hybrid vehicle of claim 1, wherein the motor is reversed on reverse start-up and reverse-direction operation of the vehicle driven by the motor.

7. The power transmitting apparatus for a hybrid vehicle of claim 1, further comprising a battery for driving the motor and a detector for determining a remaining electric charge of the battery, and wherein both the driving force of the engine and that of the motor are simultaneously transmitted to the driving wheels with both the first and second clutch being activated so long as the remaining electric charge of the battery determined by the detector is within an particular range.

8. The power transmitting apparatus for a hybrid vehicle of claim 1, further comprising a battery for driving the motor and a detector for determining a remaining electric charge of the battery, and wherein the driving force of the engine is transmitted both to the driving wheels and the motor such that the motor generates electricity when the remaining electric charge of the battery determined by the detector during vehicle movement is less than the predetermined value.

9. The power transmitting apparatus for a hybrid vehicle of claim 1, further comprising a battery for driving the motor and a detector for determining a remaining electric charge of the battery, and wherein the driving force of the engine to the driving wheels is cut off and simultaneously the driving force of the engine is transmitted to the motor such that the motor generates electricity when the remaining electric charge of the battery determined by the detector while the vehicle is stopped is less than the predetermined value.

10. The power transmitting apparatus for a hybrid vehicle of claim 1, wherein the driving force of the engine is transmitted to the driving wheels and the driving force of the motor to the driving wheels is simultaneously cut off on start-up under a low environmental temperature or during operation of the vehicle at high speed.

11. The power transmitting apparatus for a hybrid vehicle of claim 1, wherein an automatic transmission is operatively positioned in the power transmitting system between the first and second clutches and the driving wheels and vehicle speed can be changed by the automatic transmission.

12. The power transmitting apparatus for a hybrid vehicle of claim 11, wherein the automatic transmission is a continuously variable transmission.

13. The power transmitting apparatus for a hybrid vehicle of claim 11, wherein the automatic transmission is a double-clutch-type transmission.

14. The power transmitting apparatus for a hybrid vehicle of claim 11, wherein the automatic transmission is a single-clutch-type transmission.

15. The power transmitting apparatus for a hybrid vehicle of claim 1, wherein a damper mechanism for damping a torque variation is operatively connected in the power transmitting system between the engine and the first clutch.

16. The power transmitting apparatus for a hybrid vehicle of claim 1, further comprising an electrically driven oil pump, and wherein the first and second clutches are activated by hydraulic pressure generated by the electrically driven oil pump.

17. The power transmitting apparatus for a hybrid vehicle of claim 1, wherein the odd numbered gears of the transmission comprise a plurality of forward gears.

18. The power transmitting apparatus for a hybrid vehicle of claim 1, wherein the even numbered gears of the transmission comprise a plurality of forward gears.

19. A power transmitting apparatus for a hybrid vehicle, comprising:
a first clutch means operatively positioned in a power transmission system between an engine mounted on a vehicle and driving wheels and configured to transmit or cut off driving force of the engine to or from the driving wheels;
a second clutch means operatively positioned in a power transmission system between a motor mounted on a vehicle to the driving wheels and configured to transmit or cut off driving force of the motor to or from the driving wheels, the first and second clutch means being operated based on vehicle operating conditions to connect the engine and the motor to transmit power from one of the engine and the motor to the other while cutting off power transmission from the engine and the motor to the driving wheels;
a third clutch means operatively positioned between an output side of the first and second clutch means and a transmission having gears and mounted on the hybrid vehicle and configured to transmit or cut-off the driving force between the engine or the motor and the transmission, the third clutch means including an odd clutch means configured to transmit or cut-off power to odd numbered gears of the transmission and an even clutch means configured to transmit or cut-off power to even numbered gears of the transmission;
a selecting means for transitioning the power transmitting apparatus between a hybrid mode and an engine mode; and
a return spring configured to bias both the first and second clutches to a disconnected state;
wherein the power transmitting apparatus operates the first clutch means, the second clutch means, the odd clutch means, and the even clutch means when the power transmitting apparatus changes a gear ratio of the transmission while operating in the hybrid mode;
wherein the second clutch means cuts off the motor from the driving wheels and the power transmitting apparatus operates the first clutch means, the odd clutch means, and the even clutch means when the power transmitting apparatus changes the gear ratio of the transmission while operating in the engine mode;
wherein the third clutch means transmits or cuts off all driving force from the first and second clutch means to the transmission;
wherein the first clutch, the second clutch and hydraulic pistons corresponding to each of the first and second clutch are arranged within a same housing, and wherein the first and second clutch can be operated in a selective manner by controlling a hydraulic pressure for actuating the hydraulic pistons; and
wherein the first and second clutches each include driven-side clutch discs mounted on the same housing.

* * * * *